United States Patent [19]

Szymber

[11] 3,770,882

[45] Nov. 6, 1973

[54] VIDEO REPRODUCTION SYSTEM FOR PHOTOGRAPHIC AND OTHER IMAGES

[75] Inventor: Oleg Szymber, Elk Grove, Ill.

[73] Assignee: GAF Corporation, New York, N.Y.

[22] Filed: July 3, 1972

[21] Appl. No.: 268,517

Related U.S. Application Data

[63] Continuation-in-part of Ser. No. 162,150, July 13, 1971.

[52] U.S. Cl. .............................. 178/5.2 A, 178/6.8
[51] Int. Cl. .............................................. H04n 9/30
[58] Field of Search .................. 178/5.2 A, DIG. 28, 178/6.8

[56] References Cited

UNITED STATES PATENTS 2,757,571 8/1956 Loughren ........................ 178/5.2 A

*Primary Examiner*—Robert L. Richardson
*Assistant Examiner*—F. Konzem
*Attorney*—Walter C. Kehm et al.

[57] ABSTRACT

An improved system for reproducing transparent photographic and other film images and the images of opaque objects on a television screen is provided in which the television picture tube upon which the image is displayed is utilized as a flying spot scanner to emit pulsating beams to sample the image. Each such beam from the tube is focused upon the image by a suitable lens. A photo-detector is positioned to receive the light from the television tube which passes through or is reflected from the image and is responsive to the intensity of such light, which varies with the optical density or reflectance of the image, to produce electrical signals related thereto. The signals are amplified, filtered to eliminate that portion representing screen brightness decay, and returned via a sample and hold feedback circuit to the television unit to modulate the intensity of the screen illumination at any instantaneous spot in accordance with the signal intensity representing the corresponding spot on the image, and thereby reproduce the image upon the screen. This invention is adaptable for still and motion picture reproduction, black-and-white and color reproduction, and positive to positive and negative to positive reproduction, and may be readily employed in a home television entertainment system.

44 Claims, 11 Drawing Figures

VIDEO REPRODUCTION SYSTEM FOR PHOTOGRAPHIC AND OTHER IMAGES

BACKGROUND OF THE INVENTION

This application is a continuation-in-part of copending application, Ser. No. 162,150, filed July 13, 1971.

A video picture is produced by a beam of electrons which strike phosphorescent coating material disposed on the inner face of a television tube. When hit by the electrons the phosphorescent material glows brightly to produce a visible spot. The spot is scanned across the tube in both the horizontal and vertical directions at a rapid rate in a typewriter-like pattern to create the optical illusion that the entire screen is lighted. A complete scan, which is known as a raster, takes about one-thirtieth of a second. To produce an image upon the screen, the intensity of the spot on any instantaneous point is modulated by adjusting the flow of electrons to produce lighter and darker areas corresponding to the lighter and darker areas of the image to be reproduced.

In present systems for televising transparent or opaque images, this is accomplished by utilizing either a conventional vidicon tube television camera or a device as a flying spot scanner. The flying spot scanner emits a spot beam which corresponds in scanning speed and direction to the raster spot on the television screen. The beam is directed from the scanner through a photographic transparency to be reproduced, and is picked up by a photo-electric cell which produces an electrical signal corresponding in magnitude to the intensity of the light received. This signal is amplified and fed into the television circuit to control the intensity of the electron beam. In this manner, the brightness of the scanning raster spot at any point upon the viewing screen depends upon the optical density of the photographic transparency at a corresponding point. The modulation of the screen spot traveling at high speed thereby reproduces the image on the screen.

For this system to work properly, it is essential that the position of the spot emitted by the flying spot scanner be in complete synchronization with the raster pattern on the television screen. This requires both scan speed and scan direction synchronization. If there is but the slightest misorientation between the scanner pattern and the television screen pattern, the picture reproduced upon the screen will be distorted. To exemplify this point, consider that the flying spot scanner is orientated 90 degrees out of phase with the television tube raster. The flying spot will commence its scan at a position which corresponds to either the upper right hand corner or the lower left hand corner of the television screen, whereas the screen raster will commence at the upper left hand corner. Accordingly, the intensity of the spot on the screen at the upper left hand corner will correspond to the intensity of the image at either the lower left hand corner or the upper right hand corner of the transparency, so that the image reproduced on the screen will be tilted on its side.

Similarly, if the speed of the scanning spot and the viewing spot are not fully synchronized, extensive image distortion will appear upon the screen. In color television this factor is even more pronounced, since three beams corresponding to red, blue, and green must be fully synchronized in both the scanner and the television tube to avoid picture and color distortion.

Because of the difficulty in maintaining the synchronization required for such systems, and because of the high cost of the necessary electronic components, those systems that have been produced are quite expensive. Accordingly, due to their high cost and complexity such systems are not practical for home entertainment systems.

In the co-pending parent application, Ser. No. 162,150, a video reproduction system for displaying photographic and other image-bearing film transparencies and opaque images upon a television screen is provided which overcomes the above described difficulties by eliminating the flying spot scanner along with its problems of synchronization with the television tube raster, and providing instead a feedback system in which the television tube itself serves as a spot scanner of the image to be reproduced.

In the video reproduction system of the parent application, a television picture tube is positioned to emit scanning light from its screen to a subject to be reproduced. The scanning light is focused upon the subject by suitable means, and light-sensitive means, positioned to receive such scanning light which passes through or is reflected from the subject, and responsive to the intensity of such light, which varies according to the optical density or the reflectance of the subject, is provided to produce electrical signals corresponding thereto. These signals are returned to the television tube via a feedback circuit to modulate the intensity of the screen illumination at any instantaneous spot in accordance with the signal intensity generated by the light-sensitive means to reproduce the image of the subject upon the screen. The use of suitable light-snesitive means (photocells) and circuit elements permits positive to negative, positive to positive, black and white and color reproduction.

The present invention is directed toward a video reproduction system of the type disclosed in the parent application and incorporates several improvements therein.

SUMMARY OF THE INVENTION

In accordance with the present invention, an improved video reproduction system of the type utilizing a television tube upon which the image of a subject is reproduced to scan the subject, and photoelectric means energized by the scanning light passing through or reflected by the subject to generates a feedback signal to modulate the intensity of the screen illumination is provided. The major improvements resides in the fact that, rather than utilizing a direct feedback circuit in which the screen is normally held at its maximum illuniation intensity, in the case of a negative feedback system, or minimum intensity in the case of a positive feedback system and then either decreased or increased, respectively, by the feedback signal, the circuit of the instant invention is adapted to cyclically pulse the television tube to effectuate the emission of sampling beams of constant intensity at a multiplicity of instantaneous points in the raster pattern, which beams are focused upon the subject, modulated in intensity by the tonal characteristics thereof, and then picked up by the photoelectric means. The photoelectric signal generated is fed back via the circuit to pulse the tube between emissions of the sampling beams to illuminate the screen to an intensity corresponding, either positively or negatively, to the tonal characteristics of subject at the point illuminated by the preceeding sampling beam. The time duration of the pulses is such that sampling pulses are not preceptible by the viewer, but the feedback pulses produce visible images. In this manner, the scanning and image producing functions of the television tube are distinctly separated, and results in improved image reproduction.

Furthermore, the circuit of the present video reproduction system is superior to the direct feedback circuit in that it requires only a single photoelectric cell for positive to positive, negative to positive, black-and-white and color reproduction, and thus simplifies and improves the efficiency and reliability of the system. In addition, means are provided to feedback photoelectric signals representing only the rise time of the sampling beam, rather than both the rise time and decay time as in prior systems, so as to minimize visible screen persistance which tends to distort the reproduced image.

In general, the improved video reproduction system of the present invention comprises, in combination, a television picture tube adapted to cyclically emit a multiplicity of sampling beams from its screen raster during each scan thereof; means to focus said sampling beams on the subject, the image of which is to be reproduced on said screen; light-sensitive means positioned to receive such portion of the sampling beams which is focused upon the subject and represents the tonal characteristics of the subject at any instantaneous point thereon, said light-sensitive means being responsive to the intensity of such beams to produce electrical signals corresponding in magnitude thereto; and a feedback control circuit, connecting the light-sensitive means and the television tube adapted to cyclically pulse the tube to effectuate the emission of said sampling beams, and to cyclically modulate the intensity of the screen illumination at each screen point corresponding to the instantaneous subject point upon which each sampling beam is focused in accordance with the signals generated by the light sensitive means to reproduce the image of the subject on the television screen.

In its most basic form for black and white reproduction, the feedback circuit comprises a single sample and hold subcircuit adapted to cyclically produce constant level sample pulses which energize the television tube, or more commonly referred to in the art as CRT for cathode ray tube, by controlling the brightness level to emit the constant intensity sampling beams. The sample and hold subcircuit also stores each electrical signal generated by the light-sensitive means for the duration of each sample pulse and then emits an output pulse corresponding in magnitude to the signal produced by the light-sensitive means to energize the CRT to a brightness level representing the tonal characteristics of the subject point illuminated by the preceding sampling beam. In this manner the subject image is reproduced on the CRT screen.

The feedback circuit also includes a pulse generator which cyclically emits a control pulse which activates the sample and hold subcircuit to produce the sample pulses. While in the activated state the sample and hold subricuit stores the input signals generated by the light-sensitive means.

For purposes of illustration, let us assume that the subject to be reproduced is image-bearing transparent film. A projection gate is provided to hold and/or guide the film in a position to receive the sampling beams from the CRT, and each such sampling beam is focused upon an instantaneous point on the transparency by focusing means, such as an objective lens system. The optical density of the transparency at that point determines the amount of light that will pass and hence the magnitude of the electrical signal generated by the light-sensitive means.

The light sensitive means can be simply one or more conventional photosensitive cells responsive to light of all or of particular wave lengths and adapted to produce electrical signals corresponding in current magnitude to the intensity of the light passing through the film and focused thereupon. In general, suitable photocells or photodetectors as they are also called may be classified and grouped as follows; Photoconductors (photoresistors) of the cadmium sulfide, cadmium selenide, lead sulfide, lead selenide, and indium aresenide type; photovoltaics of the silicon and selenide type; photo-emissive detectors including phototubes and photomultipliers; and junction photodectors including photodiodes and phototransistors of the germanium and silicon type, and photoswitches of the silicion type. Photomultipleirs having high current output for low light levels and having a spectral response that includes all visible light, are preferred for the system of the invention due to their high sensitivity and fast response. Photocells of the above type are readily available commercially and cen be selected to have the necessary characteristics for any particular system.

The electrical signals generated by the photocell are amplified and fed back to the input of the sample and hold subcircuit and stored therein. Upon the completion of each control pulse, the sample and hold subcircuit is deactivated, the sample pulse ceases, and the stored signal from the photocell is emitted as an output pulse to modulate the brightness of the instantaneous screen spot in accordance with the intensity of the photoelectrically produced signals. The duration of the output pulse is at least six times greater than the duration of the sample pulse, so that the screen spot representing the reproduction of the corresponding slide spot dominates the viewer's perception. As the sample and hold subcircuit is cyclically activated by the pulse generator the sampling beams emitted from the screen raster scan the transparency, so that the light and dark areas in the case of black-and-white reproduction, and the various colored areas in the case of color reproduction, appearing on the television screen, correspond in intensity either directly or inversely to the light and dark areas of the transparency, thus reproducing the image.

Similarly, in the case of image-bearing opaque photographic or other prints a projection gage can also be provided to hold the print in position to receive scanning light from the screen. In this case, however, the photocell is disposed in a position to receive reflected scanned light from the print. The amount of light so received by the photocell depends upon the reflectance of the print which is in turn a function of the light and dark areas of the image at any instantaneous point. Thus, the signals generated by the photocell vary in accordance with the light and dark areas of the print, so that the output pulses modulate the screen intensity to reproduce the image. In the same manner the scanning television screen spot can be focused upon three dimensional objects, reflected thereby and refocused upon a suitably positioned photocell.

The basic system of the invention described above, accomplishes only black-and-white reproduction, However, to extend the scope of the circuit to reproduce color is a simple step which requires merely the addition of two sample and hold subcircuits to the feedback circuit. In the back-and-white embodiment described above, the sample and hold subcircuit receives input signals from the photoelectric cell which vary in intensity according to the tonal quality of the subject. Likewise, output pulses from the sample and hold subcircuit represent variations only in tonal quality of the subject and thus merely control the brightness of the reproduced picture. For color reproduction, the sample pulses and output pulses from each of the three sample and hold subcircuits are adapted to energize one of the three electron guns for red, blue and green brightness control, in a color CRT. The pulse generator in the color system is adapted to sequentially pulse the red, blue and green sample and hold subcircuits, so that each sequentially produces sample pulses which activate the red, blue and green electron guns in the CRT, to individually illuminate the image to be reproduced at instantaneous points. It should be noted that although this system successfully reproduces a color image, only a single photoelectric cell is required, unlike prior systems which require a separate photocell, for each of the three primary colors.

However, since only a single photocell is utilized it is important that there is no overlap in the sampling beams emitted from the screen and picked up by the photocell. While the pulse generator is capable of spacing the control pulses such that each of the red, blue and green sampling pulses are sequentially produced in a manner that does not time wise overlap each other, the decay times for the phosphorescent screen material used in color television tubes is such that there can be a time overlap in the corresponding sampling beams, if the sampling pulses produced by the three sample and hold subcircuits are closely spaced. Typically, the decay time to 10 percent of original brightness in a color CRT is as follows:

red— 600 microseconds
blue— 25 microseconds
green— 60 microseconds

Since the duration of one raster line is 63.5 microseconds, one short pulse of the red electron gun will continue to emit 10 percent of its original brightness 10 lines later. This means that attainable resolution would be very poor. However, it has been found that the rise time of phosphorous materials is not victimized by this phenomenon, so that it is possible to derive the necessary intelligence for reproducing an image from the rise portions of the sampling beam only and thereby avoid the decay slope which creates the overlap problem. To accomplish this, a high pass filter which passes high frequency components of the photocell signals only is disposed in the circuit between the photocell and the sample and hold subcircuit. Since only the rise time of the photocell signal has high frequency, the input signal fed to the sample and hold subcircuit represents only the rise time of the sampling beam emitted from the screen. Since there is a corresponding output pulse for each sampling beam, the number of sampling beams per line of the raster defines the picture solution. For example, to resolve 400 characters per line, one must use 400 sampling beams per line. The ratio of the duration of the output pulse to its repetition time represents the average brightness that will appear to the viewer.

The feedback control circuit can be adapted to operate in either a positive or negative feedback mode for both color and black-and-white. In the positive feedback mode the control circuit operates to modulate the screen intensity in direct proportion to the input signals received from the photocell, so that a dark spot on the subject will appear as a dark spot on the reproduced screen image. Since the scanning sampling beams are cyclically emitted, the tendency for the reproduced picture to stabilize the screen illumination at its minimum or maximum levels, as is inherent in the invention of the co-pending application, Ser. No. 162,150, is eliminated. Each sampling pulse produces an independent output pulse which controls the screen brightness. The CRT is normally stabilized at its minimum brightness intensity level. Each sample pulse instantaneously brightens the screen to emit maximum intensity sampling beam. The resultant feedback input signal having a magnitude corresponding to the tonal chracteristics of the image spot illuminated by the beam is fed to the CRT as the output pulse of the sample and hold means upon the cessation of the sample pulse, to produce a corresponding screen spot equal in intensity to the minimum brightness level, plus the brightness value of the output pulse.

As an example, if the sampling beam contracts a clear slide spot, the photo cell receives maximum screen light and accordingly generates a maximum signal. When this maximum signal is returned to the CRT as the output pulse of the sample and hold subcircuit it is added to the normal minimum brightness to produce a maximum intensity screen spot corresponding to the clear slide spot. On the other hand, if the sampling beam contacts a black or non transparent slide spot, the photocell will produce a zero or minimum signal which when returned to the CRT and added to the minimum brightness level will produce a minimum intensity spot corresponding to the dark slide spot.

In the negative feedback mode the control circuit operates to modulate the screen intensity inversely with respect to the signals received from the photocell, so that a dark subject spot appears as a light screen spot. In this mode the screen is also normally stabilized at minimum intensity. The sample pulse instantaneously brightens the screen to its maximum intensity to emit the sampling beam. Upon cessation of each sample pulse the output pulse from the sample and hold circuit, representing the feedback signal, is then fed to the CRT to produce a screen spot having an intensity level equal to the maximum brightness less the corresponding brightness value of the output pulse. Circuitry well known to those skilled in the art is provided to accomplish the pulse subtraction. If the negative slide is clear at any point contacted by the sampling beam, the photocell receives the maximum amount of light from the screen and in response thereto generates a maximum signal. When this signal is fed back to the sample and hold circuit, a maximum output pulse is produced. Subtracting this maximum output pulse from the maximum brightness produces a dark spot on the screen. If the next sample beam contacts a black or opaque spot on the negative slide, no photocell current is produced, the output signal is zero, and the reproduced spot will be at the maximum brightness level.

The adaptation of the improved video reproduction system of the invention to transparent and opaque images, black and white, color, still and motion pictures as well as negative to positive and positive to positive reproduction is further described with regard to the several embodiments shown in the accompanying drawings.

BRIEF DESCRIPTION OF DRAWINGS

FIG. 6 is a front view of a preferred embodiment of the invention in the form of a home television entertainment system.

DESCRIPTION OF ILLUSTRATED EMBODIMENTS

Figure 1:
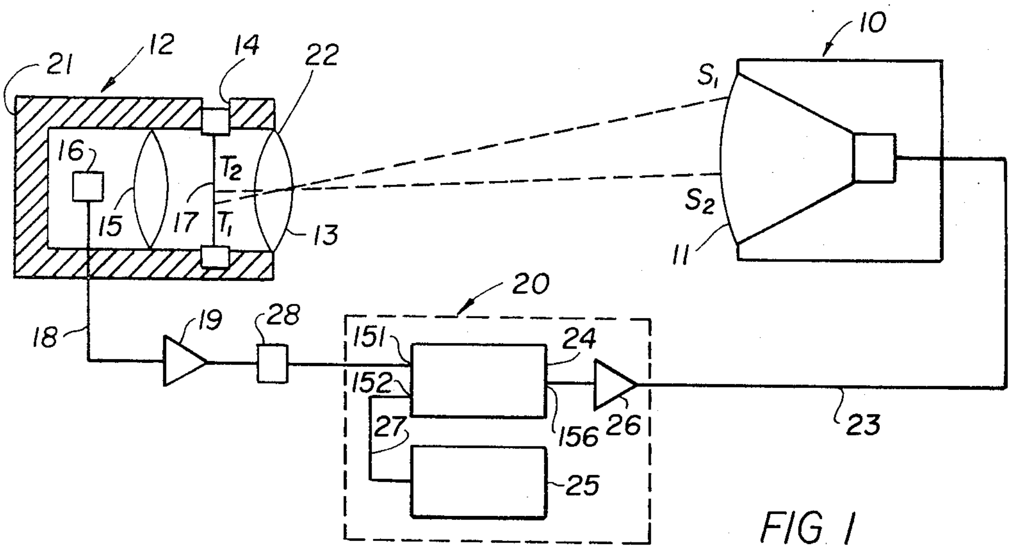
FIG. 1 is a schematic diagram of one embodiment of the invention having a feedback control circuit adopted for black and white image reproduction.

Referring to FIG. 1, a video reproduction system for displaying photographic transparencies on a television screen is illustrated which is adapted for negative to positive and/or positive to positive black-and-white still image production. This is the most basic form that the invention can take.

The system utilizes a conventional black-and-white television set 10 having a cathode ray picture tube 11 which is adapted to cyclically emit a multiplicity of sampling beams from its screen raster. An optical pick-up and feedback unit 12 adapted to hold at least one photographic transparency 17 receives the sampling beams from the raster of television tube 11 and generates an electrical impulse, corresponding in magnitude to the amount of light passing through the transparency 17, which impulse is fed back to the television set 10 via photo-amplifier 19 and control circuit 20. The optical pick-up and feedback unit 12 comprises a housing 21 having a light receiving opening 22 positioned to receive light from the television tube 11 and a film gate 14 disposed transversely across opening 22 and adapted to hold photographic slide 17. An objective lens 13 disposed within opening 22 is adapted to focus the light of the sampling beams received from the screen upon a slide disposed within film gate 14. Light-sensitive means 16 is positioned within housing 21 to receive the light which passes through slide 17. A condenser lens 15 refocuses such light upon the light-sensitive means. The light-sensitive means 16 is of the type known as a photomultiplier which is sensitive to the intensity of the light focused upon it, and in response thereto generates electrical signals proportional in magnitude to such light intensity. The signals generated are carried via line 18 to amplifier 19 which is of the video type having a frequency band-width of about 30 Megahertz. Although shown schematically in FIG. 1 as being external of the unit 12, amplifier 19 and control circuit 20 can be disposed within housing 21 of the optical pick-up and feedback unit 12, is so desired.

The optical pick-up and feedback unit 12 corresponds to a conventional slide projector with the exception that it is adapted to receive light generated from an outside source, i.e., the television tube, rather than to project light upon a reflective surface. In fact, a conventional slide projector can be utilized for this purpose simply by replacing the projection bulb with a photomultiplier and its associated circuitry. In this respect it should be noted that although a simple device adapted to hold a single slide 17 is illustrated in FIG. 1, it will be apparent to those skilled in the art that a more complex projection unit adapted to receive a slide tray containing a plurality of slides and having means for indexing the slide tray and transporting a selected slide to and from the projection gate can also be utilized.

The conventional circuit 20 can be either of the negative feedback or positive feedback type, as previously described, for modulating the intensity of the electron beam within the cathode ray tube at any given instant in response to the boosted signals received from light sensitive means 16. Circuit 20 is adapted to convert the amplified photoelectrically generated current into conventional video rf signals, in a manner such that line 23 extending from control circuit 20 can be simply connected to the antenna lead wires of television set 10. The rf signals operate in conjunction with the video receiving and brightness circuitry of the television set to cyclically pulse the screen intensity at an instantaneous point in proportion to the amplified signals received from light-sensitive means 16. It should be noted that the rf signals produced by the control circuit can also be fed into a conventional transmitter for wireless transmission to the TV antenna.

Another alternative is to eliminate the rf signal generating portion of the control circuit and feed the amplified control signals directly into the brightness circuitry of the television. This by-passes most of the television circuit and simplifies the entire system. However, connection of the feedback circuit to the appropriate points of the brightness circuit requires a skilled technician, unless lead wires are drawn to an external point. Therefore, in cases where an optical pickup and feedback unit including the appropriate circuitry is provided as an accessory component to an existing television set, it is preferable to arrange the control circuit for direct connection to the television antenna leads. But, where such unit is provided in conjunction with a compatibly designed TV, such as a television home entertainment system, the simplified circuit is preferred.

The control circuit 20 comprises a sample and hold subcircuit 24 adapted to cyclically produce sample pulses of constant magnitude which, after amplification by a conventional video amplifier 26, energize the electron gun of TV tube 11 to emit sampling beams of maximum brightness from a multiplicity of instantaneous points in the raster pattern to scan the slide 17 as a pulsating flying spot. To activate the sample and hold subcircuit 24, control circuit 20 also includes a pulse generator 25 connected to the sample and hold at a control input terminal 152 by means of line 27. The pulse generator 25 cyclically emits a control pulse to turn on the sample and hold subcircuit and thus permits the production of the sample pulses, which pulses correspond in duration to the control pulses. While in the activated state, the sample and hold subcircuit 24, in addition to emitting sample pulses, stores the feedback input signals received from photocell 16, via a feedback input terminal 151. Upon cessation of each control pulse, the corresponding stored feedback signal is released as an output pulse by the sample and hold at an output terminal 156 and fed via amplifier 26 to the CRT 11 to brighten the screen at a point corresponding to the point on slide 17 illuminated by the immediately proceeding sample beam to reproduce the image of that point on the screen.

As is apparent from the foregoing, the object of the sample and hold subcircuit 24 is to sample the input from photocell 16 for a short of time, corresponding to the duration of each control pulse emitted by the pulse generator 25, and then emit an output pulse of equivalent value for a duration equal to the time delay between each control pulse, which, as mentioned hereinbefore, is approximately six times greater that the control pulse duration. During the sampling time the output or brightness of the CRT (sampling beam) is at its maximum. Following the sampling time, the magnitude of the output pulse, and the CRT output are proportional to the magnitude of the signal from photocell 16. Since the sampling pulse duration is relatively short in comparison to the output pulse, the viewer's perception is dominated by the reproduced image raather than the sampling beams.

Each sample pulse and corresponding output pulse emitted from the sample and hold subcircuit are independent from the preceeding and subsequent pulses so that the reproduced image at any given point is not influenced by prior screen light emissions. In this manner the screen brightness can be stabilized at the proper level without excessive contrast in both the positive and negative reproduction systems. In addition, to avoid distortion of the feedback signals caused by screen persistance following each sampling beam, a high pass filter 28 is provided to pass only the high frequency portion of the photoelectrically generated signals. As mentioned hereinbefore, only the rise time of the sampling beams produces a high frequency signal, so that the filter 28 effectively prevents any feedback signals produced by screen persistance TO reach the control circuit 20.

To produce a positive image of slide 17 on the TV screen, the output pulse is applied directly to a video amplifier 26 to the CRT electron gun to energize the screen to a brightness level directly proportional in magnitude to the output pulse. To produce a negative image of slide 17, the output pulse which is applied to the CRT electron gun has a magnitude equivalent to the difference in magnitude between the feedback signal and the sample pulse. To accomplish this the sample and hold subcircuit includes additional circuit means adapted to normally energize the CRT to its maximum brightness (as does the sample pulse) between sample pulses and to subtract fromsuch maximum pulses the feedback signal, so that if the feedback signal has a high magnitude representing a relatively clear slide, the output pulse will be of low magnitude to produce a relatively dark picture. Conversely, if the slide is dark, the feedback signal will be low and the output pulse will be high to produce a relatively light picture.

Figure 2:
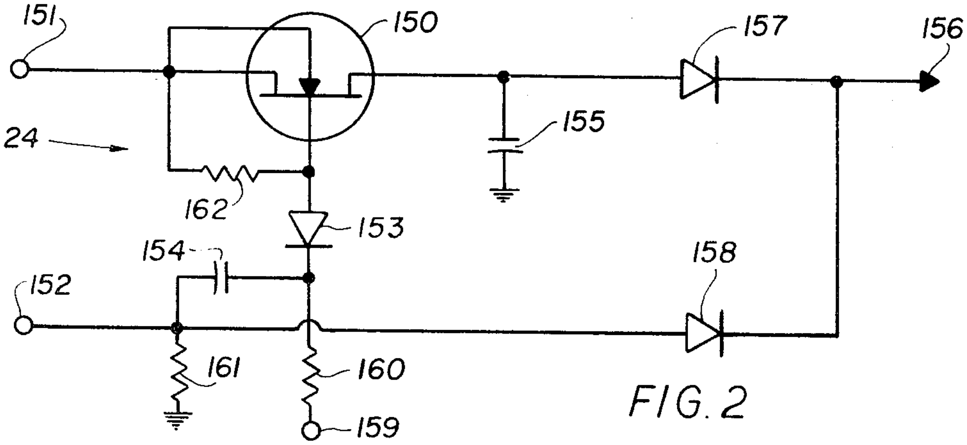
FIG. 2 is a schematic diagram of a preferred sample and hold subcircuit.

The preferred sample and hold subcircuit 24 shown in FIG. 2, is adapted for positive to positive reproduction and comprises a field effect transistor (FET) 150 having a source terminal connected to the feedback input terminal 151, a gate connected via diode 153 and capacitor 154 to the control input terminal 152, and a drain terminal connected to capacitor 155. A diode 157 connects capacitor 155 to the output terminal 156. Similarly, diode 158 connects the control input terminal 152 to the output terminal 156. In the normal or "off" state, where no control pulse appears at terminal 152, the gate of FET 150 is negatively biased with respect to it s source by means of a negative potential, which can be about − 10V, applied at terminal 159. In this state there is no current flow between the source and drain terminals of the FET. Likewise, there is no current flow between the input control terminal 152 and the output terminal 156, so that the voltage of capacitor 155 will appear at the output terminal due to diode 157.

When a control pulse which has a positive potential equal to the negative potential applied at terminal 159 is applied at terminal 152 by means of pulse generator 25, capacitor 154 will elevate the voltage of the cathode of diode 153 to a positive value with respect to its anode, thus creating a reverse bias which cuts off current flow through diode 153. Resistors 160 and 161 and capacitor 154 represent the required RC time constant for each control pulse applied to terminal 152. Simultaneously with the cut off of diode 153, resistor 162, connecting the source terminal and the gate of FET 150, permit the potential at the source and the gate to equalize. This represents the "on" state of the FET and permits bidirectional current flow between the source terminal and the drain terminal, which charges capacitor 155 to the voltage level equal to the feedback signal applied at input terminal 152.

It should be noted that the control pulse is always higher in voltage than the maximum value feedback signal, so that the sample pulse output at terminal 156 of the sample and hold subcircuit is substantially equal to the control pulse applied at terminal 152. This occurs because the higher control pulse voltage creates a forward bias to activate diode 158, but a reverse bias to deactivate diode 157. When the control pulse ceases, the FET will again switch to its "off" state, isolating capacitor 155 from any feedback signals appearing at terminal 151. In this condition, diode 157 will be activated due to a higher voltage applied to its anode rather than its cathode and diode 158 will be activated due to reverse bias across it, so that the output pulse emitted at terminal 156 will have the same value as the charge on capacitor 155, to thereby energize the CRT in accordance with the photoelectrically generated feedback signals. To prevent rapid discharge of capacitor 155 between control pulses (sample pulses) the impedance of the next stage in the control circuit, in this case amplifier 26, should be relatively high.

In operation, television set 10 is turned on and set to an unused channel. Note, however, that where the output pulses are fed directly to the cathode tube brightness control, it is preferable to set the television on a used channel. This provides a more uniform raster, without interference, since the output pulses cut out normal transmission. Slide 17 is inserted in the projection gate 14 of the optical pickup and feedback unit 12, and the unit 12 is aimed at the television screen. It should be noted that although the optical axis of the pickup unit 12 and the television tube 11 are shown to be coaxially disposed on FIG. 1, such positioning is not essential so long as lens 13 is positioned to pick up the entire lighted area of the television screen. However, to avoid keystone distortion lens 13 and slide 17 must be disposed in planes parallel to screen 11. Each sampling beam emitted from the television screen is focused by lens 13 upon slide 17, and then refocused by condenser lens 15 on photocell 16. The signal generated by the photocell is proportional in intensity to the light incident upon it. When amplified and fed back into the television set via control circuit 20 as described above the signal modulates the next following instantaneous spot appearing on the screen in proportion to the light reaching photocell 16.

As an example, consider that the control circuit 20 includes pulse subtraction means (not shown) and is adapted for negative to positive reproduction so that the light areas of the slide 17 appear as dark areas on the screen, and the dark areas of slide 17 appear as light areas on the screen to reproduce a positive image from a negative slide. Upon start up a control pulse from the pulse generator 25 activates the sample and hold subcircuit 24 to produce a sample pulse which energizes the CRT to emit a sampling beam from point S–1 on screen 11. The light emitted from point S–1 is focused upon a corresponding point T–1 on the transparency 17. If point T–1 on the slide represents a totally black or non-transparent area, no light from the spot on the slide will reach photocell 16. Accordingly, no current will be generated by cell 16 and there will be no input signal fed back to the control circuit 20. Upon cessation of the control pulse the sample and hold will therefore produce a maximum output signal which will energize the CRT to produce a corresponding screen spot of maximum intensity. Now consider that a subsequent sampling beam is emitted from point S–2 on the screen and is focused upon slide 17 at point T–2. If point T–2 on slide 17 represents a point of minimum density, i.e., maximum transparency, the maximum amount of light from point S–2 on screen 11 will be focused on photocell 16, which will in turn produce a maximum intensity signal. This signal will be held by the sample and hold subcircuit, subtracted from a maximum pulse and emitted as an output of low intensity, to energize the CRT to a low intensity level and thus produce darkened image on the screen at that point. Similarly, if the next sample beam is focused upon a point of half density or a gray portion of the slide 17, a corresponding current will be generated by the photocell 16, and upon termination of such sample beam the control circuit 20 will emit an output pulse of one-half maximum intensity to produce a corresponding gray spot on the screen.

The same example can be used to illustrate positive to positive reproduction. In such case, however, the output pulse is directly proportional in magnitude to the feedback signal to energize the CRT to produce screen points corresponding in brightness to the slide points illuminated by the preceding sampling beams.

Figure 3:
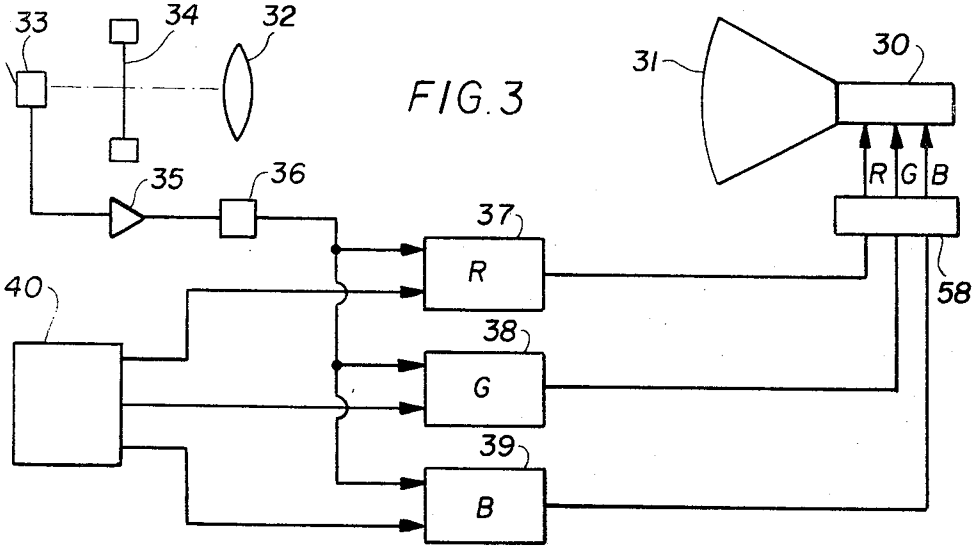
FIG. 3 is a schematic diagram of another embodiment of the video viewing system of the invention adapted for color image reproduction.

Referring now to FIG. 3, the embodiment shown therein is adapted to produce upon a television screen 31 a positive color image from a color transparencey 34. In this embodiment, a conventional color CRT 30 is adapted to sequentially emit a multiplicity of red, blue and green sampling beams from the raster of screen 31, which beams are focused upon a color slide transparency 34 by means of objective lens 32. A photocell 33 is positioned to receive such light which passes through slide 34. Naturally, the objective lens system, a suitable projection gate adapted to receive a slide and the photocell 33 can all be disposed within a unitary pick-up and feedback unit such as that shown in FIg. 1. Photocell 33 is sensitive to light of all wave lengths and is responsive thereto to generate electrical signals proportional in magnitude to the intensity to such light focused upon it. The signals generated by photocell 33 are boosted by photo-amplifier 35, filtered by high pass filter 36, and then fed back to the control circuit which produces corresponding red, blue and green output pulses to reproduce the slide image upon screen 31.

The control circuit employed in the embodiment of FIG. 3 is quite similar to that shown in FIG. 1; however, it includes three sample and hold subcircuits 37, 38 and 39, each substantially the same as that illustrated in FIG. 2, adapted to produce red, green and blue sample and output pulses to respectively control the corresponding red, green and blue electron guns in color CRT 30. A video amplifier 58 boosts the sample and output pulses emitted by the sample and hold subcircuits 37, 38 and 39 before they are fed to the color TV tube 30.

Figure 4:
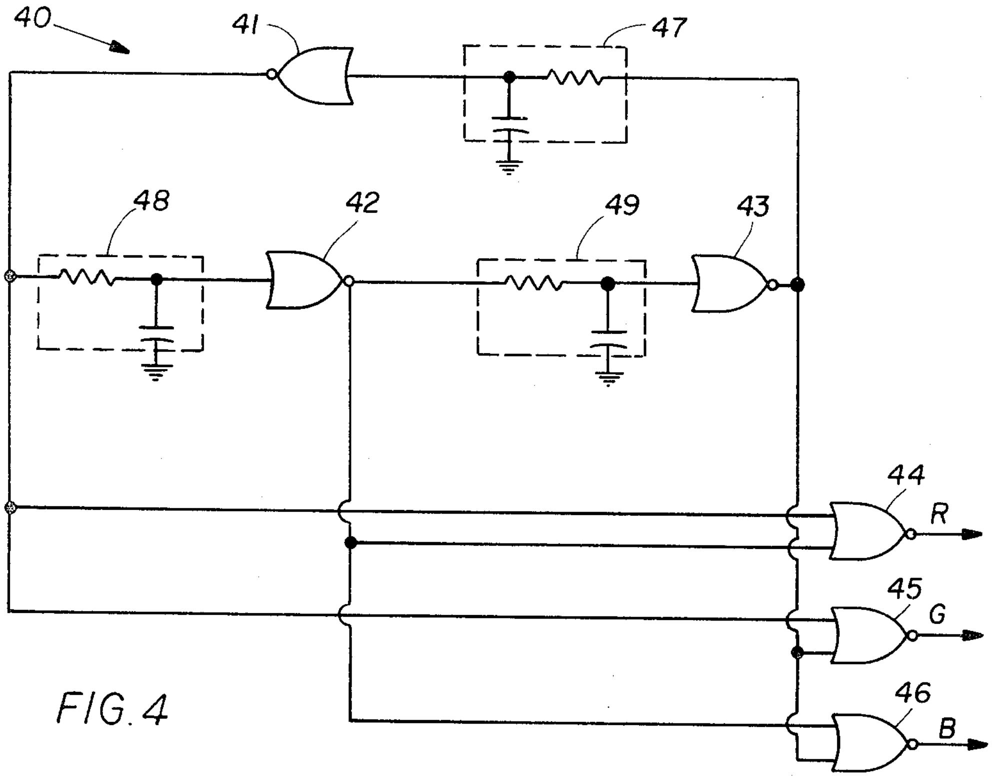
FIG. 4 is a schematic diagram of the preferred pulse generator utilized in the embodiment of FIG. 3.
Figure 5:
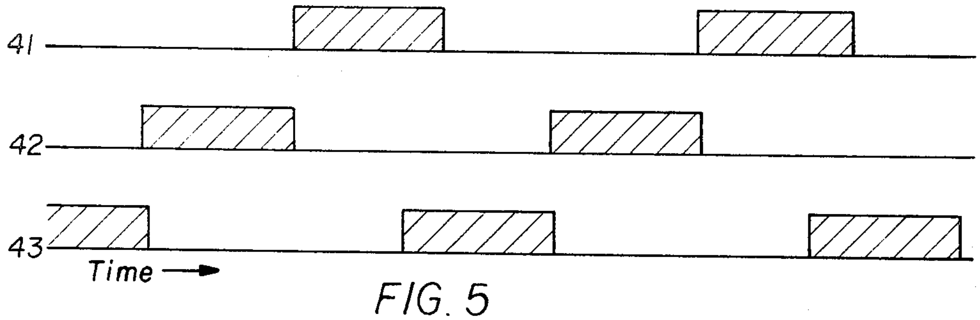
FIG. 5 is a diagram showing the output sequence of the logic gates of the pulse generator of FIG. 4.
Figure 6:
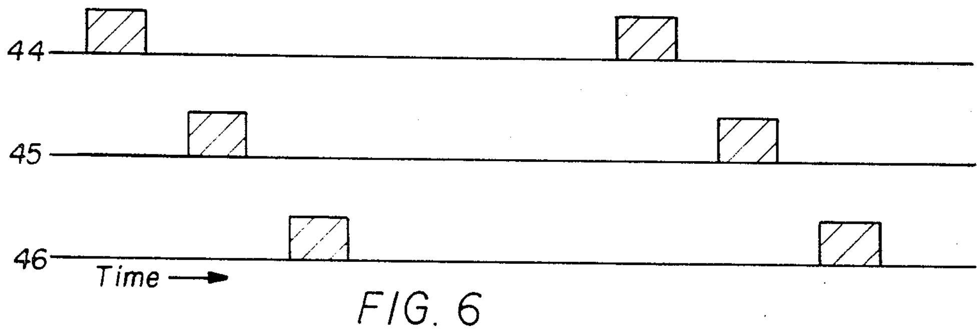
FIG. 6 is a diagram showing the output sequence of the pulse generator of FIG. 4.

A pulse generator 40 is connected to each of the sample and hold subcircuits 37, 38 and 39 and is adapted to sequentially activate each of said subcircuits, so that they sequentially emit red, green and blue sample pulses to energize CRT 30 to produce corresponding red, green and blue sampling beams. The pulse generator 40 can be constructed using inverting logic gates 41, 42, and 43 and corresponding RC networks 47, 48 and 49 connected as shown in the schematic of FIG. 4. The resistance of each resistor and capacitance of each capacitor in the three networks are equal. The logic gates and the associated RC networks from an oscillator, the frequency of which is determined by the RC time constant and propagation delay time of each of the gates. FIG. 5 shows a time diagram for the outputs of each of the logic gates 41, 42 and 43. These outputs are connected to three NOR gates 44, 45 and 46 each adapted to produce a positive control pulse when both of the inputs are low (i.e., between the high outputs as shown in FIG. 5) to activate the corresponding red, green or blue sample and hold subcircuit. As seen in FIG. 6, the positive control pulse duration from each gate is about one/sixth of the repetition duration. Furthermore, each control pulse is shifted by one-third of the repetition time, so that they are equally spaced in relation to each other.

As control pulse is emitted from NOR gate 44 of the pulse generator 40 red sample pulse and hold subcircuit 37 is actiavated to produce a red sample pulse, which, after being boosted by amplifier 58, energizes the red electron gun of CRT 30 to emit a maximum intensity red sampling beam from the raster of screen 31. As can be seen in FIG. 5, during the time the red sample and hold subcircuit 37 is in the activated state, the green and blue sample and hold subcircuits are in the non-activated or off states, since no control pulses are produced at NOR gates 45 and 46. While the red sample and hold subcircuit 37 is emitting a sample pulse, it will also receive and store the photoelectrically generated signals from photocell 33, which signals will be proportional in magnitude to the amount of red light focused upon it. If the color of the point on slide 34 struck by the red sampling beam contains red, photocell 33 will produce such a feedback signal to be stored in sample and hold subcircuit 37. But, if such point contains no red color, no feedback signal will be produced, since the slide will serve as a light filter preventing any portion of the red sampling beam from reaching cell 33. Upon cessation of the control pulse emitter from NOR gate 44, and until the emission of another control pulse from NOR gate 44, sample and hold subcircuit 37 will release an output pulse corresponding in intensity to the feedback signal received from photocell 33, which pulse will energize the red gun of the CRT 30 to reproduce a red spot of intensity and position corresponding to the point on slide 34 struck by the red sampling beam, to reproduce an image of such spot on screen 31.

Upon the completion of the output pulse emitted from sample and hold subcircuit 37, sample and hold subcircuit 38 will be activated by the control pulse emitted from NOR gate 45 of the pulse generator 40, so that a green sample pulse will be fed to the green gun of the CRT 30 to emit a maximum intensity green sampling beam. When this occurs, as can be seen in the time diagram of FIG. 6, both the red sample and hold subcircuit 37 and the blue sample and hold subcircuit 39 will be in their off states so that they produce no sample pulses. If the point on slide 34 illuminated by the green sampling beam contains no green color, no light will reach photocell 33 and no feedback signal will be produced. Accordingly, upon cessation of the control pulse activating subcircuit 38, no output pulse will be produced and no green will appear at the corresponding screen point.

The next control pulse is emitted from NOR gate 46 of the pulse generator 40 to activate sample and hold subcircuit 39 so that it will produce a blue sample pulse. The blue pulse energizes CRT 30 so emit a blue sampling beam. As described above with reference to the other colors, if this beam strikes a blue portion of slide 34 a signal will be generated by photocell 33 which will be stored by sample and hold subcircuit 39 until cessation of the control pulse from NOR gate 46. If the blue sampling beam strikes a portion of the slide containing no blue color, then no feedback signal will be produced by the photocell 33 and upon cessation of the control pulse emitted from NOR gate 46 no blue will appear at the corresponding point on screen 31.

As discussed herein before, there can be as many as 400 or more individual sample pulses and corresponding output pulses produced by the control circuit for each line of the raster pattern appearing on screen 31, so that the viewer perceives the proper mix of colors so as to visualize a clear and accurate reproduction of the slide image and not a series of red, blue and green flashing lights.

Positive to positive or negative to positive color reproduction can be accomplished in much the same way as the negative or positive black and white reproduction described with reference to the embodiment of FIG. 1. In the case of color, however, each of the three individual sample and hold subcircuits are adapted to either produce an output pulse, which is either proportional in magnitude to the feedback pulse received from photocell 33 for positive reproduction, or which represents the difference in magnitude between the feedback signal and a maximum intensity signal for negative reproduction.

Consider the following example: In the case of negative reproduction, if slide 34 is a color negative of an all green field, it will be composed of its complimentary color magneta, which comprises the primary colors of red and blue. In this manner, slide 34 will only pass red and blue light and photocell 33 will, therefore, generate feedback signals only when illuminated by the red and blue sampling beams during activation of sample and hold subcircuits 37 and 39. The photocell, on the other hand, will receive no light from the television screen during the sample pulse time of sample and hold subcircuit 38, since green light will not pass through slide 34. In the negative mode the control circuit operates to attenuate the particular screen color in proportion to the output pulses generated from the corresponding color sample and hold subcircuits by subtracting the feedback signal from a signal which tends to illuminate the screen to maximum brightness. Therefore, the intensity of the red and blue beams appearing on screen 31 will be minimized, since the feedback signals resulting from the red and blue sampling beams are high, and the intensity of the green will be maximized, since the feedback signals resulting from the green sampling beam is zero, thus reproducing an entire green field on the screen.

Table I illustrates the operation of this device for several other colors. In observing this table, it should be noted that the combination of red, blue and green produces white light on a conventional color TV screen and that the combination of red and green produces yellow light on the screen. Also note that a color negative contains dye images which are negative with respect to the tone gradations of the original subject and are complimentary to the colors of the subject. Thus, a bright red subject yields a dark cyan negative. The negative acts as a color filter and will pass light of only those colors from which it is composed. Table I is representative of the colors that can be produced, and is in no way intended as a limitation. Furthermore, each slide can contain streak or overlapping areas of mixed colors.

The multiplicity of sampling beams emitted from

TABLE I

| | | | | | | | | | |
|---|---|---|---|---|---|---|---|---|---|
| Subject color | Red | Blue | Yellow | Orange | Magenta | Cyan | Black | White | Gray. |
| Negative complimentary color | Cyan (blue-green). | Yellow | Blue | Blue-cyan. | Green | Red | White | Black | Do. |
| Photocell pickup | Blue-green | Red-green. | do | Blue-blue-green. | do | do | Red-blue-green. | None | Red-blue-green (partially illuminated). |
| Reproduced screen color | Red | Blue | Yellow (red-green). | Orange (red-yellow). | Magenta (red-blue). | Cyan (blue-green). | Black (no color). | White (red, blue, green). | Gray (red, blue, green, partial intensity). |

color screen 31 scans slide 34 in the same manner as the black-and-white embodiment described in FIG. 1, that the image appearing on the screen at any instantaneous point corresponds directly in position and inversely in color and brightness to that spot on the slide.

Table I can also be utilized to illustrate a positive to positive reproduction system. In this case, each of the sample and hold subcircuit produces an output pulse proportional in magnitude to the feedback signal received from the photocell 33, so that the subject color appearing on the slide is reproduced directly on screen 31. This is accomplished by eliminating the subtraction portion of the control circuit. The stored feedback signal is converted directly to an output signal to directly control the illumination intensity of the screen.

Figure 7:
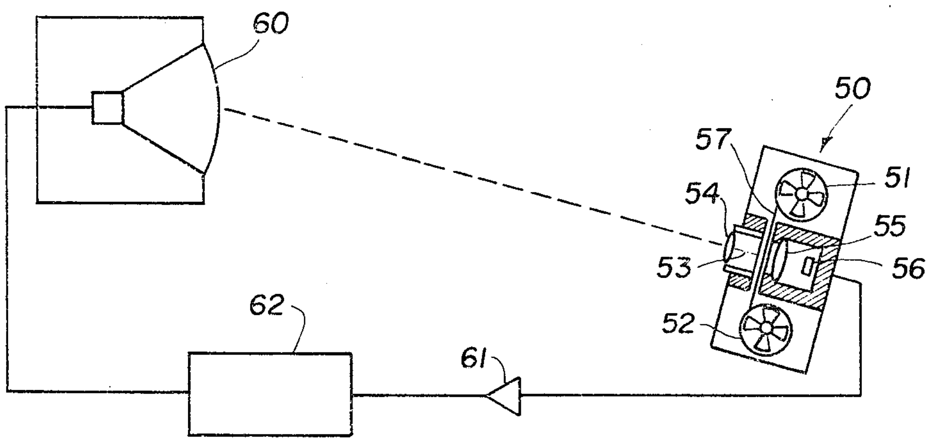
FIG. 7 is a schematic diagram of another embodiment of the invention adapted for the reproduction of motion pictures upon a television screen.

FIG. 7 illustrates the television viewing system of the invention adapted for the reproduction of motion pictures. In this embodiment an optical pick-up and feedback unit 50 is in the form of a motion picture pprojector having a supply real 51, a take up real 52, and motor means in operative connection with said reals for transporting films 57 from the supply real 51 to the take up real 52 via projection gate 53. Objective lens 54 focuses the sampling beams emitted from television screen 60 upon the particular frame of film 57 disposed within the projection gate 53 at any given instant. The light passing through film 57 is focused by means of condenser lens 55 upon light-sensitive means 56 in the form of a photomultiplier cell. The signal generated by cell 56 is boosted by amplifier 61 and fed back in to the television set to control the intensity of the image upon screen 60 by means of control circuit 62. The operation of the photomultiplier 56, amplifier 61 and control circuit 62 can be the same as that described above with respect to FIGS. 1 and 3. In other words, the system shown in FIG. 6 can be adapted to display on television screen 60 a positive image from negative film or a positive image of position film in both color and black-and-white.

In conventional 8 mm or super 8 mm motion picture projection, the film is transported through the projection gate at the rate of approximately 16 frames per second. Such movement, however, is not continuous. The film moves in incremental steps, and durinthe instantaneous time period when light from the projector reaches the screen, the film stops. In other words, the film starts and stops 16 times each second. During the movement period, a shutter blocks the light from the lens and thereby prevents blurriness of the image on the screen. What is projected is a rapid succession of 16 still pictures each second. Pull down means, often in the form of a claw, is used to engage the film sprocket to advance the film the required distance for each frame.

In the television motion picture system of the invention, as illustrated in FIG, 7, it is necessary that each film frame to be reproduced upon screen 60 be either stationary within film gate 53 or have zero relative motion with respect to each screen raster as it is being scanned by the multiplicity of sampling beams emitted from screen 60. If the film is moving when contacted by a sampling beam, a distorted image will appear on the screen. Accordingly, the speed of the screen raster must be equal to or be some multiple of the frame speed of the film. As mentioned hereinbefore, conventional television produces 30 rasters per second. This is approximately twice the number of frames projected in a conventional motion picture projector. Accordingly, the frame speed of the film as it is advanced through film gate 53 of pick up and feedback unit 50 can be adjusted to 15 frames per second to correspond to the speed of each raster pattern upon the television screen, so that the scanned light is being beamed upon only a rapid succession of still pictures. The slight reduction in frame speed does not noticeably affect the optical chracteristics of the televised image. Alternatively, the raster pattern speed of tube 60 can be increased to 32 per second to accomplish the same frame-raster synchronization.

In conventional motion picture projection systems it is common to interpose a movable mechanical shutter between the projection bulb and the screen to prevent screen illumination during the movement of the film from frame to frame. The same system can be utilized in the television motion picture system of FIG. 7.

An alternative shutter system is of the electronic type, and that is preferred for this embodiment. Switching means can be provided in association with control circuit 62 to fully deactivate the screen brightness control during movement of the film from frame to frame. A simple microswitch (not shown) associated with the frame pulldown claw can be adapted to alternately energize and de-energize a portion of circuit 62 for accomplishing the electronic shutter operation in synchronization with the movement of film 57. Similarly, a photocell which receives direct screen light when the film is stationary, but is shielded from the light by the pulldown claw during the film advance can be electrically connected to the television circuit to intermittently deactivate the screen light. In this manner the screen is unlighted during frame advancement and lighted in accordance with the photoelectrically generated feedback signals when the film is stationary.

A still further shutter alternative is available which has the advantages of eliminating the mechanical film pulldown claw device and permitting continuous advancement of the film without intermittent stopping while each frame is televised. This is accomplished by synchronizing the film advancement speed with the raster scan speed and the raster frequency; i.e., number of rasters per second. In this manner the relative motion between the screen scan and each film frame can be controlled so that the flying spot is focused upon a relatively image. The means for implementing such synchronization between film speed and television tube raster pattern speed are quite simple. A continuously driven sprocket wheel of friction wheel is provided to advance the film at a constant speed through the projection gate. The drive means for the sprocket wheel, which can be a conventional A.C. to D.C. motor is mechanically connected to a multifaced rotatable prism. The prism enables the projection of stationary images from a film advanced with a uniform speed synchronized with the rotational speed of the prism so that all times the deviation of the beam of screen light caused by the refraction through the prism is equal with and opposite indirection to the displacement of the film so that there is no relative motion between each raster and each frame. The photoelectric pickup and feedback system operates in its normal manner since the scanning light is focused upon what appears to be nonmoving. A suitable prism synchronization system is shown in U.S. Pat. No. 3,563,643.

Figure 8:
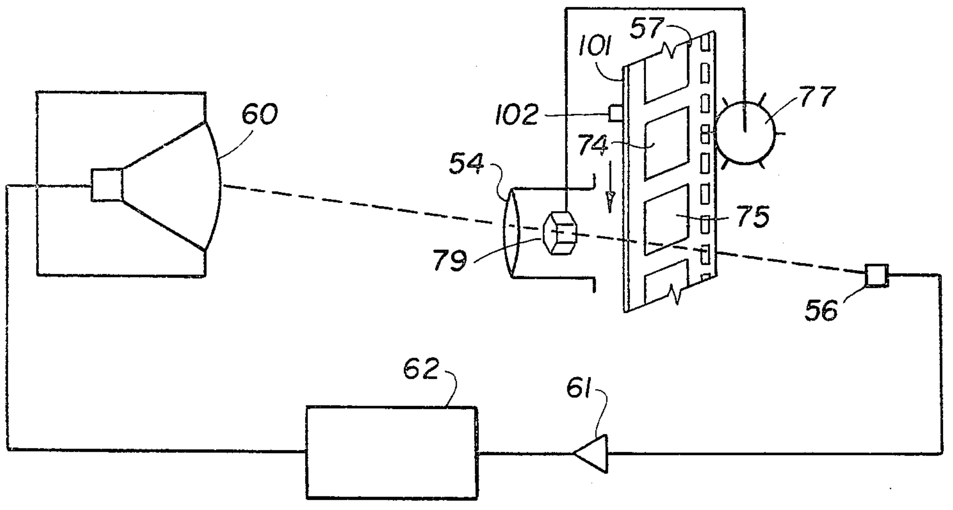
FIG. 8 illustrates means for synchronizing the speed of motion picture film and the TV raster for use in the embodiment of FIG. 6.

This is illustrated in FIG. 8. Motor driven sprocket wheel 77 advances motion picture film 57 at a constant continuous speed through projection gate 53. The drive motor for sprocket wheel 77 (not shown) is connected and synchronized with rotatable prism 79. The prism 79 is operative to synchronize the speed of the raster pattern appearing on screen 60 with film advancement speed of each frame. Frame 75, shown in the gate 53, is scanned by the sampling beams emitted from the raster of screen 60. As frame 75 leaves the gate the raster scan is complete and it jumps to meet frame 74 as it moves into the gate. This is automatically repeated for each frame.

Since the film is advanced at a constant continuous speed, a magnetic sound track 101 can also be included on the film and suitable transducer pickup means 102 employed in the optical pickup and feedback device to provide accompanying sound and motion picture reproduction. Continuous movement of the sound track past the transducer eliminates sound distortion which is prevalent in many sound motion picture systems due to the incremental advancement of the film frames.

Figure 9:
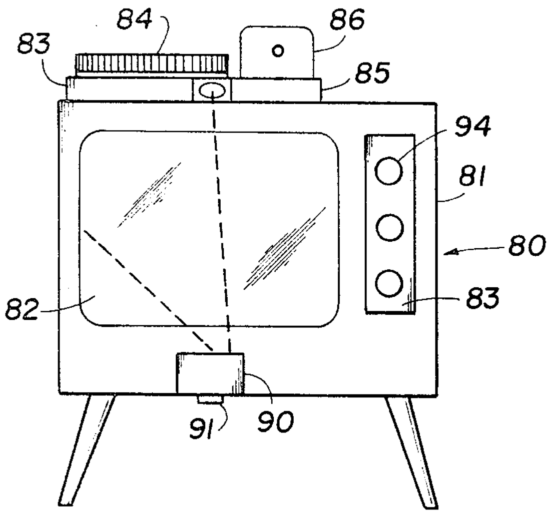
Figure 10:
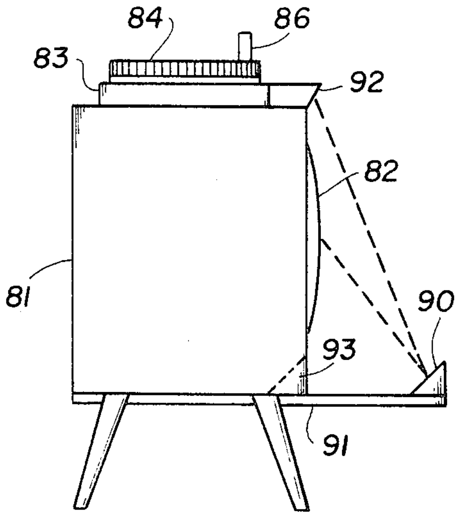
FIG. 10 is a side view of the embodiment shown in FIG. 8.

The home television entertainment system shown in FIGS. 9 and 10 is preferred embodiment of the devices illustrated in the previously described figures. The system comprises a color television unit 80 having a cabinet 81, a color picture tube 82, and a control panel 83. Mounted on the top portion of cabinet 81 is a slide presentation unit 83 having a horizontally disposed rotary slide tray 84. A motion picture presentation unit 85 adapted to receive a continuous loop motion picture film cartridge 86 is also disposed on the top of cabinet 81.

An angularly disposed mirror 90 mounted on a slidable bracket 91 is disposed in an extended position at the lower front portion of cabinet 81. In the extended position as shown in FIG. 10, mirror 90 is adapted to reflect the scanning light emitted from screen 82 toward an optical pickup lens 92 mounted above the television screen at the top of cabinet 81. A niche 93 is provided in the lower front portion of cabinet 81 to receive mirror 90 when it is not in use. The screen light reflected by mirror 90 and picked up by lens 92 is focused by means of additional mirrors and lenses (not shown) upon a film transparency disposed in a projection gate within cabinet 81. The light passing through the transparencey is picked up by a series of photoelectric cells and fed back into the picture tube via a reproduction system, such as that shown in FIG. 7 for positive to postitive color reproduction.

It is preferable to utilize separate projection gates for the slides contained in slide tray 84 and for the continuous loop motion picture film contained in cartridge 86. A mechanical linkage between a select knob and the appropriate lens and mirror sytstem can be provided to switch the reproduction system from the slide mode to the motion picture mode. It should be noted that although a horizontally disposed slide tray unit is shown, other types of slide projection units such as those adapted to receive a vertical or box tray or those of the stack loading type or any other slide system can be employed in the home television entertainment system. Likewise, this embodiment is described with reference to a continuous loop motion picture film cartridge 86. The motion picture system associated with this unit can be the reel to reel type in which both reels are contained in a single cassette or wherein one reel is contained in a cartridge and the second reel is disposed within the television unit. Such arrangements will be apparent to those skilled in the art. In addition, any of the film advancement means described with relation to FIGS. 7 and 8 can be employed in the embodiment shown in FIGS. 9 and 10.

In operation, the desired mode of operation is selected by utilizing a control knob 94. Positions are provided for normal television broadcasting, slide transparency reproduction and motion picture transparency reproduction. Further positions can be provided for positive to positive or negative to positive reproduction. Mirror 90 is then withdrawn from niche 93 to the reflect position as shown in FIG. 9, and the television unit is turned on. If the motion picture mode was selected, the film cartridge 86 will be transported through projection gate in the manner described above with relation to FIGS. 7 and 8, and the image contained on that film will be reproduced upon screen 82. It should be noted that suitable audio pickup means can be provided so that a sound track can be included on the film contained in cartridge 86. If the slide transparency mode is selected, then the slides contained in tray 84 are sequentially advanced to the projection gate, transported from the tray into the projection gate whereupon the images contained thereon are reproduced upon screen 82. Suitable slide changing means can be provided to return the slide to tray 84 and advance tray 84 to the next position.

Figure 11:
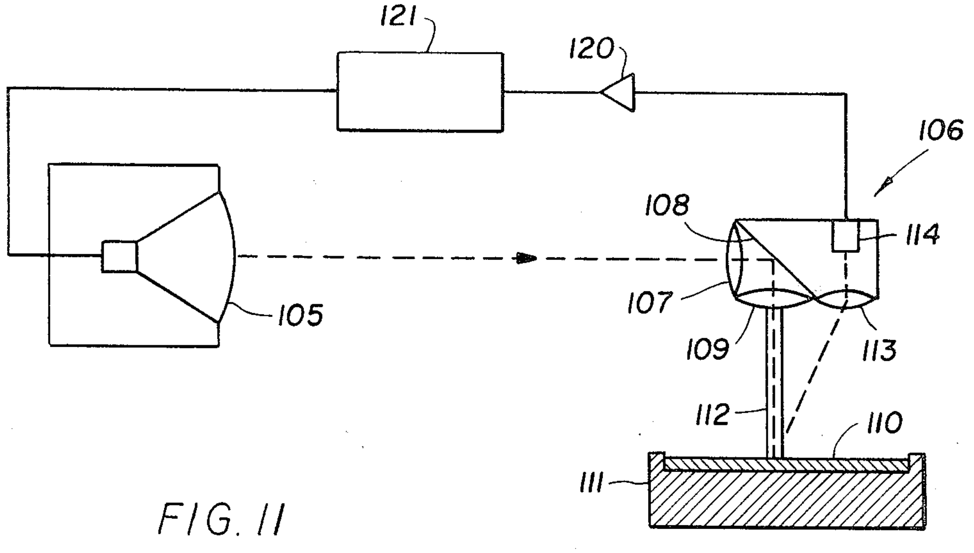
FIG. 11 is a schematic diagram of another embodiment of the invention adapted for opaque image reproduction.

FIG. 11 illustrates the video reproduction system of the invention adapted for use with an overhead projection unit. The system comprises a television tube 105 which emits plusing scanning light (sampling beams) to an optical pickup and feedback unit 106. The unit 16 comprises a mirror 108, a receiving lens 107 for focusing the screen light upon mirror 108, and an objective lens 109 for refocusing the light reflected from mirror 108 upon an opaque image 110 disposed in holder 111. Leg 112 holds the optical pickup and feedback unit 106 in a raised spaced apart position with respect to the opaque image 110 and permits vertical adjustment for achieving proper focus. A third lens 113 receives that portion of each sampling beam reflected from the opaque image 110 and focuses such light upon photomultiplier 114 which generates an electrical signal in response to and proportional in magnitude to the light focused upon it. Such signals are boosted by video amplifier 120 and fed back to the television tube 105 via feedback control circuit 121. Circuit 121 can operate to modulate the screen illumination intensity in either direct or inverse proportion ot the magnitude of the boosted photoelectrically generated current received from amplifier 120. The operation of this embodiment is quite similar to the operation of the embodiments shown in FIGS. 1 and 3, with the exception that light is reflected from the image to be reproduced, rather than passing therethrough.

It will be understood that the embodiments described herein are intended for illustration and not limitation of the invention. Other systems and devices utilizing a television screen feedback loop to reproduce photographic or other images will be apparent to those skilled in the art. For example, the system can be adapted for use at television transmitting studios for televising motion pictures. This is particularly useful in the case of closed circuit or cable T.V. The invention can also be adapted for use in a television-telephone communications system, in which the object images reproduces are those of the communicators.

What is claimed is:

1. A video reproduction system for displaying photographic and other images on a television screen comprising:

a television picture tube adapted to cyclically emit a multiplicity of sampling beams from its screen raster during each scan thereof;

means to focus said sampling beams upon the image to be reproduced;

light-sensitive means positioned to receive such portion of each sampling beam which is focused upon the image representing the tonal density of the image at any instantaneous point thereon, and responsive to the intensity of such light to produce electrical signals corresponding thereto; and feedback circuit means, connecting said light-sensitive means and the television tube including means to cyclically pulse the tube to effectuate the emission of said sampling beams, and to cyclically modulate the intensity of the screen illumination at each screen point corresponding to the instantaneous image point upon which each sampling beam is focused in accordance with the intensity of the signals generated by said light-sensitive means to reproduce the image upon the television screen.

2. A system in accordance with claim 1, in which the light-sensitive means comprises a photoelectric cell adapted to generate an electrical current proportional in magnitude to the intensity of scanned light received by it.

3. A system in accordance with claim 1, in which second focusing means are provided to refocus each sampling beam contacting the image upon the light-sensitive means.

4. A system in accordance with claim 1 including a video amplifier adapted to boost the electrical signals generated by the light-sensitive means.

5. A system in accordance with claim 1, which the feedback circuit means comprises a sample and hold subcircuit adapted to cyclically produce constant magnitude sample pulses to energize the brightness level of the television screen to emit said sampling beams, to store each electrical signal generated by the light-sensitive means for the duration of each sample pulse, and to emit an output pulse corresponding in magnitude to the signal generated by the light-sensitive means upon cessation of said sample pulse to energize the television screen to a brightness level corresponding to the tonal characteristics of the image at the point upon which the immediately preceeding sampling beam was focused, the succession of such points thereby reproducing the image on said screen.

6. A system in accordance with claim 5 in which the constant level sample pulses emitted by the sample and hold subcircuit energize the screen to produce sampling beams of substantially maximum intensity.

7. A system in accordance with claim 5, in which the feedback circuit means further comprises a pulse generator adapted to cyclically emit a control pulse which activates the sample and hold subcircuit to produce said sample pulses, and to store the resultant signals generated by the light-sensitive means.

8. A system in accordance with claim 5, in which the sample and hold subcircuit produces output pulses having a duration of at least approximately six times greater than the duration of the sample pulse, so that the screen point representing the reproduction of the corresponding image point rather than the sampling beam dominates the viewer's perception.

9. A system in accordance with claim 1, in which the television tube normally produces minimum intensity screen points between sampling beams, and the feedback circuit means is adapted to increase the screen intensity at such points in direct proportion to the intensity of the signals generated by said light-sensitive means to reproduce a positive image from a positive image and a negative image from a negative image.

10. A system in accordance with claim 1, in which the television tube is adapted to normally produce maximum intensity screen points between sampling beams, and the feedback circuit means is adapted to decrease the screen intensity at such points in direct proportion to the intensity of the signals generated by said light-sensitive means to reproduce a positive image from a negative image and vice versa.

11. A system in accordance with claim 1, including means for holding image bearing media in a position to receive the sampling beams emitted from said screen.

12. A system in accordance with claim 11, in which said holding means comprises a film gate for photographic transparencies.

13. A system in accordance with claim 12, in which the film gate, focusing means, and light-sensitive means comprise at least a portion of an optical pickup and feedback unit.

14. A system according to claim 12, further comprising means for receiving a slide magazine; means for indexing said slide magazine to advance any desired slide into position for viewing; and slide changing means to transport said selected slide between the slide magazine and the film gate.

15. A system according to claim 12, further comprising means for receiving a supply of motion picture film; means for advancing said motion picture film through the film gate to reproduce the image contained on each frame thereof on the television screen; and shutter means to prevent screen illumination during movement of said motion picture film.

16. A system according to claim 12, in which the light-sensitive means is positioned to receive only that portion of the sampling beams reflected from the image-bearing media.

17. A video reproduction system for displaying color photographic and other color images on a color television screen comprising:

a color television tube having red, blue and green electron guns adapted to cyclically and sequentially emit a multiplicity of individual red, blue and green sampling beams from its screen raster during each scan thereof;

means to focus said sampling beams upon a color-bearing image to be reproduced;

light-sensitive means positioned to receive such portion of each sampling beam which is focused upon the image, representing the tonal density and color hue of the image at any instantaneous point thereon, and responsive to the intensity of such red, blue and green light to produce electrical signals corresponding in magnitude thereto; and feedback circuit means, connecting said light-sensitive means and the color television tube including means to cyclically and sequentially pulse the red, blue and green electron guns to effectuate the emission of said sampling beams and to cyclically and sequentially modulate the intensity of the red, blue and green light, respectively, illuminating each scren point to the instantaneous image point upon which each sampling beam is focused in accordance with the magnitude of the signals produced by said light-sensitive means to reproduce the color image the screen.

18. A system in accordance with claim 17, in which the light-sensitive means comprises a photoelectric cell adapted to generate an electrical current proportional in magnitude to the intensity of scanned light received by it.

19. A system in accordance with claim 17, in which second focusing means are provided to refocus each sampling beam contacting the image upon the light-sensitive means.

20. A system in accordance with claim 18 including a video amplifier adapted to boost the electrical signals generated by the light-sensitive means.

21. A system in accordance with claim 17, in which the feedback circuit means comprises first, second and third sample and hold subcircuits, each adapted to cyclically and sequentially produce constant magnitude sample pulses to energize the brightness level of the red, blue and green electron guns of the television tube, respectively, to emit said red, blue and green sampling beams, each adapted to store the respective electrical signal generated by the light-sensitive means for the duration of its sample pulse, and each adapted to emit an output pulse corresponding in magnitude to the signal generated by the light-sensitive means upon cessation of its sample pulse to energize the red, blue and green electron guns, respectively, of the television tube to a brightness level corresponding to the tonal density and color hue of the image at the point upon which the immediately preceeding sampling beam was focused, the succession of such points thereby reproducing the color image on said screen.

22. A system in accordance with claim 21 in which the constant level sample pulses emitted by the first, second and third sample and hold subcircuits energize the red, blue and green electron guns, respectively, to produce sampling beams of substantially maximum intensity.

23. A system in accordance with claim 21, in which the feedback circuit means further comprises a pulse generator adapted to cyclically emit a control pulse which sequentially activates the first, second and third sample and hold subcircuit to produce said sample pulses, and to store the resultant signals generated by the light-sensitive means.

24. A system in accordance with claim 21, in which each of the first, second and third sample and hold subcircuits produces output pulses the duration of which are at least approximately six times greater than the duration of the sample pulse produced by each of said sample and hold subcircuits, so that the screen point representing the reproduction of the corresponding image point rather than the sampling beam dominates the viewer's perception.

25. A system in accordance with claim 17, further comprising a high pass filter juxtaposed between the light-sensitive means and the feedback circuit means adapted to filter out that portion of each signal generated by the light-sensitive means during the decay time of each sampling beam, to avoid screen persistance.

26. A system in accordance with claim 17, in which red, blue and green electron guns of the tube normally produce minimum intensity screen points between sampling beams, and the feedback circuit means is adapted to increase the screen intensity of the signals generated by said light-sensitive means to reproduce a positive color image from a positive color image and a negative color image from a negative color image.

27. A system in accordance with claim 17, in which the red, blue and green electrode guns of the television tube are adapted to normally produce maximum intensity screen points between sampling beams, and the feedback circuit means is adapted to decrease the screen intensity of the signals generated by said light-sensitive means to reproduce a positive color image from a negative color image and vica versa.

28. A system in accordance with claim 17, including means for holding color image bearing media in a position to receive the sampling beams emitted from the said screen.

29. A system in accordance with claim 28, in which said holding means comprises a film gate for photographic transparencies.

30. A system in accordance with claim 29, in which the film gate, focusing means, and a light-sensitive means comprises at least a portion of an optical pickup and feedback unit.

31. A system according to claim 29, further comprising means for receiving a slide magazine; means for indexing said slide magazine to advance any desired slide into position for viewing; and slide changing menas to transport said selected slide between the slide magazine and the film gate.

32. A system according to claim 29, further comprising means for receiving a supply of motion picture film; means for advancing said motion picture film through the film gate to reproduce the image contained on each frame thereon on the television screen; ans shutter means to precent screen illumination during movement of said motion picture film.

33. A system according to claim 28, in which the light-sensitive means is positioned to receive only that portion of the sampling beams reflected from the image-bearing media.

34. A television entertainment system adapted for conventional black-and-shite and color reception, and video reproduction of photographic black-and-white and color film transparencies comprising:

a color television unit having red, blue and green electron guns adapted to emit pulsating scanning light;

means for alternatively selecting a conventional T.V. reception mode and a video reproduction mode;

a film gate positioned to receive such scanning light from the screen of the color television unit;

means for focusing said scanning light upon image-bearing transparent film disposed within the gate;

light-sensitive means positioned to receive such color light which passes through the film, representing the tonal density and color hue of the image at an instantanesous point thereon responsive to such color light to generate electrical signals corresponding in magnitude thereto;

feedback circuit means connecting said light-sensitive means, and the color television tube, including means to cyclically and sequentially pulse the red, blue and green electron guns to effectuate the emission of said pulsating light and to cyclically and sequentially modulate the intensity of the red, blue and green light, respectively, illuminating each screen point corresponding to the instantaneous image point upon which the pulsating light is focused in accordance with the magnitude of the signals produced by said light sensitive means to reproduce the color image upon the television screen.

35. A system according to claim 34, in which means are included for directing the scanning light from the television screen to the focusing means.

36. A system according to claim 35, in which the light directing means is a reflective surface.

37. A system according to claim 34 further comprising means for receiving a slide magazine; means for indexing said slide magazine to advance any desired slide into position for viewing; and slide changing means to transport said selected slide between the slide magazine and the film gate.

38. A system according to claim 34 further comprising means for receiving a supply of motion picture film; means for advancing said motion picture film through the film gate to reproduce the image contained on each frame thereof on the television screen; and shutter means to prevent screen illumination during movement of said motion picture film.

39. A system in accordance with claim 34 including a video amplifier adapted to boost the electrical signals generated by the light-sensitive means.

40. A system in accordance with claim 34 in which the feedback circuit means comprises first, second and third sample and hold subcircuits, each adapted to cyclically and sequentially produce constant magnitude sample pulses to energize the brightness level of the red, blue and green electron guns of the television tube, respectively, to emit red, blue and green sampling beams, each adapted to store the respective electrical signal generated by the light-sensitive means for the duration of its sample pulse, and each adapted to emit an output pulse corresponding in magnitude to the signal generated by the light-sensitive means upon cessation of its sample pulse to energize the red, blue and green electron guns, respectively, of the television tube to a brightness level corresponding to the tonal density and color hue of the image at the point upon which the immediately preceeding sampling beam was focused, the succession of such points thereby reproducing the color image on said screen.

41. A system in accordance with claim 40 in which the constant level sample pulses emitted by the first, second and third sample and hold subcircuits energize the red, blue and green electron guns, respectively, to produce sampling beams of substantially maximum intensity.

42. A system in accordance with claim 40 in which the feedback circuit means further comprises a pulse generator adapted to cyclically emit a control pulse which sequentially activates the first, second and third sample and hold subcircuit to produce said sample pulses, and to store the resultant signals generated by the light-sensitive means.

43. A system in accordance with claim 40 in which each of the first, second and third sample and hold subcircuits produces output pulses the duration of which are at least approximately six times greater than the duration of the sample pulse produced by each of the said sample and hold subcircuits so that the screen point representing the reproduction of the corresponding image point rather than the sampling beam dominates the viewer's perception.

44. A system in accordance with claim 40, further comprising a high pass filter juxtaposed between the light sensitive means and the feedback circuit means adapted to filter out that portion of each signal generated by the light-sensitive means during the decay time of each sampling beam, to avoid screen persistance.

* * * * *